United States Patent Office 2,850,417
Patented Sept. 2, 1958

2,850,417

COMPOSITION FOR AND METHODS OF FORMING OXALATE COATINGS ON METALLIC SURFACES

Herbert Arthur Henry Jenkins and Dennis Brian Freeman, London, England, assignors to Parker Rust Proof Company, Detroit, Mich., a corporation of Michigan No Drawing. Application May 16, 1956
Serial No. 585,136

Claims priority, application Great Britain May 24, 1955

16 Claims. (Cl. 148—6.14)

This invention relates to solutions and methods for producing oxalate coatings on metal surfaces.

Characteristic of heretofore known oxalic acid coating compositions is the inability of freshly prepared solutions to produce satisfactory coatings, necessitating the reprocessing of considerable quantities of work. Moreover, even after an aging or breaking-in period, the coatings resulting from processing through such solutions leave much to be desired in the manner in which they adhere to the surfaces of the work. While it is common for large amounts of sludge to be deposited from such solutions and for dust to precipitate onto the surfaces of the work, it is not known with certainty whether this is the cause of the lack of uniformity of these coatings. It is known, however, that in the practice of the present invention substantial reduction in the amount of dust precipitated onto the surfaces of the work and in the amount of sludge deposited from the working baths is a regular occurrence and uniformly distributed, firmly adherent coatings are consistently obtained. Unexpectedly, the excellent quality of the coatings is observed on metal surfaces, particularly on surfaces of iron and steel, treated in freshly made-up solutions of the present invention.

It is the provision of these superior oxalic acid coating compositions which is the principal object of the invention and as well, their make-up compositions.

Another object of the invention is to provide a replenishing composition for maintaining the working baths at proper strength during treatment of work on a continuous basis.

Still another object of the invention is to provide a method for forming uniform and firmly bonded oxalate coatings on metallic surfaces to prepare such surfaces for subsequent drawing operations or the reception of siccative coatings.

The above and related objects will become apparent during the course of the following description.

In accordance with the invention, it has been found that certain organic nitro compounds, when added to oxalic acid solutions in combination with the chlorate ion in controlled amounts, produces coatings on metal surfaces, particularly on surfaces of iron and steel which are exceptionally adherent and more uniform than coatings heretofore obtainable from known oxalic acid solutions. Unlike oxalic acid solutions containing the chlorate ion alone, or chlorate ion in combination with other substances, the excellent coatings of this invention are obtained immediately without any aging or working-in of the freshly prepared solutions.

Even after extended continuous operations, the amount of sludge deposited from the working baths of oxalic acid solutions containing the certain organic nitro compounds and the chlorate ion is extremely low and dust precipitation onto the surfaces of the work which has heretofore been characteristic of oxalic acid coating solutions is nearly eliminated.

Of the many organic nitro compounds that are known, only a selected few have been found to produce an increase in coating formation and the other effects described when incorporated in oxalic acid solutions containing the chlorate ion. These are meta-nitrobenzene sulphonic acid, 2-nitrophenol 4-sulphonic acid, the alkali metal salts thereof, para-nitrophenol and nitroguanidine. Of these, the alkali metal salts of meta-nitrobenzene sulphonic acid and 2-nitrophenol 4-sulphonic acid are superior with respect to the rapidity with which freshly prepared solutions containing these latter compounds, particularly sodium and potassium meta-nitrobenzene sulphonate and sodium and potassium 2-nitrophenol 4-sulphonate, function to form satisfactory coatings. The best results have been observed when the proportion of the above enumerated organic nitro compounds are carefully maintained. The preferred concentrations depend upon which of the organic nitro compounds are employed. When the nitro compound or compounds are restricted to one or more of the following set: meta-nitrobenzene sulphonic acid, 2-nitrophenol 4-sulphonic acid, or the alkali metal salts thereof, the preferred concentration should be maintained between 0.5 and 10 grams/liter, whereas for one or more of the set: paranitrophenol or nitroguanidine the preferred range is between 0.25 and 5 grams/liter. When one or more nitro compounds from each of the above sets are combined in the solution, the amount selected for each is that amount which will produce an increase in coating formation equivalent to that resulting from a single nitro compound in either of the above sets when used in the proportions above set forth.

Without the chlorate ion, results such as have been indicated have been observed with satisfactory regularity, but the presence of the chlorate ion evidences an unusual effect on the capabilities of the certain organic nitro compounds in enhancing the quality of coatings from, and in accelerating the reaction of, oxalic acid solutions, especially freshly prepared oxalic acid solutions. If the amount of the chlorate ion is controlled within the general range between 0.2 gram/liter and 8 grams/liter its effect is pronounced and if the strength of the chlorate ion is maintained within certain defined limits, depending upon the particular organic nitro compound employed, it exerts its greatest influence. With the first above-mentioned set of nitro compounds mentioned, the amount of the chlorate ion is preferably maintained between about 0.4 gram/liter and 8 grams/liter and with the second set above, viz., nitroguanidine and/or para-nitrophenol, the chlorate ion is preferably within the range from 0.2 gram/liter to 4 grams/liter. The chlorate ion is introduced into the solution within these proportions by way of the alkali metal chlorates, preferably sodium and potassium chlorate, to avoid extraneous cations.

The above amounts of the nitro compounds enumerated and the chlorate ion are added to aqueous solutions of oxalic acid, the concentration of which is not critical, but preferably is maintained between about 5 grams/liter and 25 grams/liter.

The method of the invention comprises the steps of degreasing or otherwise preliminary cleaning the metallic surfaces of the work to be treated, if this is found to be necessary, and thereafter contacting the surface with the compositions of the invention for a time sufficient to produce a useful coating thereon. The temperature of the solution is not critical, but preferably room temperature or temperatures slightly above and below are employed. The solutions may be applied equally well by spraying or immersion. The work is then separated from the solution, rinsed and dried. Water rinsing is quite suitable, but surprisingly, it has been discovered that the corrosion resistance of the coatings are substantially enhanced if subsequently the coated work is rinsed in dilute aqueous solutions of gallic acid, tannic acid or salts thereof or mixtures of such compounds. Just why rinses in these enumerated compounds improve the corrosion resistance of the applied coatings and why the same results are not obtained with other known rinses is not completely understood. The corrosion resistance of the coatings cannot be improved with chromate or chromic acid rinses, for example. In attempts to improve the corrosion resistance with chromate rinse solutions, it was found that blistering of subsequently applied paint resulted. The concentration of the rinse solutions of gallic acid, tannic acid or the salts thereof has been found to produce best results if maintained between 0.5 to 3 percent by weight.

The treated surfaces may be painted, lacquered, or varnished or coated with other siccative finishes for which the coatings are excellent bases. The coatings also are useful for protecting metal surfaces during drawing operations such as deformation of sheet metal or metal wire drawing. In the latter applications, the coatings serve as satisfactory protectors except for the more severe drawing operations and as to these, the coatings have proved to be useful if well known drawing lubricants are also employed.

The following examples are illustrative of the compositions of the invention and were prepared by dissolving the respective nitro compound and sodium chlorate in aqueous solutions of oxalic acid, all in the proportions indicated.

*Example 1*

| | Grams/liter |
|---|---|
| Oxalic acid | 15 |
| Sodium chlorate | 5 |
| Sodium 2-nitrophenol 4-sulphonate | 5 |

*Example 2*

| | |
|---|---|
| Oxalic acid | 20 |
| Sodium chlorate | 5 |
| Sodium meta-nitrobenzene sulphonate | 5 |

*Example 3*

| | |
|---|---|
| Oxalic acid | 10 |
| Sodium chlorate | 5 |
| Nitroguanidine | 5 |

Mild steel was processed through each of the above solutions and very uniform coatings as determined by visual inspection were obtained without any breaking-in period. The adhesions of the coatings were far superior to similar solutions without the nitro compounds. Representative samples of the coated work from each of the above solutions were rinsed in a 1% by weight solutions of gallic and tannic acid and substantial improvement in both bare corrosion resistance and in corrosion resistance of subsequently painted surfaces were noted.

The following solutions were made for comparison purposes:

*Example 4*

| | Grams |
|---|---|
| Oxalic acid | 15 |
| Sodium chlorate | 5 |
| Water to make 1 liter. | |

*Example 5*

| | |
|---|---|
| Oxalic acid | 15 |
| Sodium chlorate | 5 |
| Sodium meta-nitrobenzene sulphonate | 5 |
| Water to make 1 liter. | |

The coatings produced on mild steel surfaces from the solution of Example 4 were much inferior to those produced from Example 5 with respect to both uniformity and adhesion.

*Example 6*

| | Weight percent |
|---|---|
| Oxalic acid dihydrate | 60 |
| Sodium chlorate | 20 |
| Organic nitro compound | 20 |

Compositions employing each of the organic nitro compounds previously set forth in an amount corresponding to the above were used for preparing working baths for commercial operations in the proportions of 24 lbs. of each composition in 100 gallons of water and entirely satisfactory baths were obtained.

For replenishing these baths to maintain their strength when work was processed with them on a continuous basis, compositions employing each of the nitro compounds in an amount corresponding to the following were used:

*Example 7*

| | Weight percent |
|---|---|
| Oxalic acid dihydrate | 64.5 |
| Sodium chlorate | 19.5 |
| Organic nitro compound | 16 |

The above replenishing compositions were added periodically as the acidity or points of the bath fell off to maintain the quality of the coatings in the amounts of approximately 1.9 lbs. per point per 100 gallons of bath solution.

What is claimed is:

1. A composition for forming oxalate coatings on metallic surfaces comprising an aqueous solution consisting essentially of oxalic acid, about 0.2 to 10 grams/liter of the chlorate ion, and an amount sufficient to produce an increase in coating formation of at least one organic nitro compound selected from the group consisting of meta-nitrobenzene sulphonic acid, 2-nitrophenol 4-sulphonic acid, alkali metal salts thereof, para-nitrophenol and nitroguanidine.

2. A composition for forming oxalate coatings on metallic surfaces comprising an aqueous solution consisting essentially of oxalic acid, about 0.2 to 10 grams/liter of the chlorate ion, and at least one organic nitro compound selected from the group consisting of 0.5 to 10 grams/liter of meta-nitrobenzene sulphonic acid, 2-nitrophenol 4-sulphonic acid, alkali metal salts thereof, 0.25 to 5 grams/liter of para-nitrophenol and nitroguanidine.

3. A composition for forming oxalate coatings on metallic surfaces comprising an aqueous solution consisting essentially of oxalic acid, about 0.4 to 8 grams/liter of the chlorate ion, and about 0.5 to 10 grams/liter of sodium meta-nitrobenzene sulphonate.

4. A composition for forming oxalate coatings on metallic surfaces comprising an aqueous solution consisting essentially of oxalic acid, about 0.4 to 8 grams/liter of the chlorate ion, and about 0.5 to 10 grams-liter of sodium 2-nitrophenol 4-sulphonate.

5. A composition for forming oxalate coatings on metallic surfaces comprising an aqueous solution consisting essentially of oxalic acid, about 0.2 to 4 grams/liter of the chlorate ion and about 0.25 to 5 grams/liter of para-nitrophenol.

6. A composition for forming oxalate coatings on metallic surfaces comprising an aqueous solution consisting essentially of oxalic acid, about 0.2 to 4 grams/liter of the chlorate ion and about 0.25 to 5 grams/liter of nitroguanidine.

7. A make up composition for dissolving in water to form aqueous oxalate coating solutions consisting essentially of in percentage by weight: about 60% of oxalic acid dihydrate, about 20% of sodium chlorate, and about 20% of at least one compound selected from the group consisting of meta-nitrobenzene sulphonic acid, 2-nitrophenol 4-sulphonic acid, alkali metal salts thereof, para-nitrophenol and nitroguanidine.

8. A replenishing composition for replenishing aqueous solutions comprising oxalic acid, the chlorate ion and one or more organic nitro compounds, said composition consisting essentially of in percentage by weight: about 64.5% of oxalic acid dihydrate, about 19.5% of sodium chlorate, and about 16% of at least one compound selected from the group consisting of meta-nitrobenzene sulphonic acid, 2-nitrophenol 4-sulphonic acid, alkali metal salts thereof, para-nitrophenol and nitroguanidine.

9. A method for forming oxalate coatings on a metallic surface which comprises the steps of contacting the metallic surface to be coated with an aqueous solution consisting essentially of oxalic acid, about 0.2 to 10 grams/liter of the chlorate ion, and an amount sufficient to produce an increase in coating formation of at least one organic nitro compound selected from the group consisting of meta-nitrobenzene sulphonic acid, 2-nitrophenol 4-sulphonic acid, alkali metal salts thereof, para-nitrophenol and nitroguanidine.

10. A method for forming oxolate coatings on a metallic surface which comprises the steps of contacting the metallic surface to be coated with an aqueous solution consisting essentially of oxalic acid, about 0.2 to 10 grams/liter of the chlorate ion, and at least one organic nitro compound selected from the group consisting of 0.5 to 10 grams/liter of meta-nitrobenzene sulphonic acid, 2-nitrophenol 4-sulphonic acid, alkali metal salts thereof, 0.25 to 5 grams/liter of para-nitrophenol and nitro guanidine.

11. A method for forming oxalate coatings on a metallic surface which comprises the steps of contacting the metallic surface to be coated with an aqueous solution consisting essentially of oxalic acid, about 0.4 to 8 grams/liter of the chlorate ion, and about 0.5 to 10 grams/liter of sodium meta-nitrobenzene sulphonate.

12. A method for forming oxalate coatings on a metallic surface which comprises the steps of contacting the metallic surface to be coated with an aqueous solution consisting essentially of oxalic acid, about 0.4 to 8 grams/liter of the chlorate ion, and about 0.5 to 10 grams/liter of sodium 2-nitrophenol 4-sulphonate.

13. A method for forming oxalate coatings on metallic surfaces which comprises the steps of contacting a metallic surface with an aqueous solution consisting essentially of oxalic acid, about 0.2 to 4 grams/liter of the chlorate ion, about 0.25 to 5 grams/liter of para-nitrophenol.

14. A method for forming oxalate coatings on metallic surfaces which comprises the steps of contacting a metallic surface with an aqueous solution consisting essentially of oxalic acid, about 0.2 to 4 grams/liter of the chlorate ion, about 0.25 to 5 grams/liter of nitroguanidine.

15. A method for forming oxalate coatings on a metallic surface which comprises the steps of contacting the metallic surface to be coated with an aqueous solution consisting essentially of oxalic acid, about 0.2 to 10 grams/liter of the chlorate ion, and an amount sufficient to produce an increase in coating formation of at least one organic nitro compound selected from the group consisting of meta-nitrobenzene sulphonic acid, 2-nitrophenol 4-sulphonic acid, alkali metal salts thereof, para-nitrophenol and nitroguanidine, and thereafter rinsing the coated metal surface in a dilute aqueous solution consisting essentially of at least one compound selected from the group consisting of gallic acid, tannic acid, and salts thereof.

16. A method for forming oxalate coatings on a metallic surface which comprises the steps of contacting the metallic surface to be coated with an aqueous solution consisting essentially of oxalic acid, about 0.2 to 10 grams/liter of the chlorate ion, and at least one organic nitro compound selected from the group consisting of 0.5 to 10 grams/liter of meta-nitrobenzene sulphonic acid, 2-nitrophenol 4-sulphonic acid, alkali metal salts thereof, 0.25 to 5 grams/liter of para-nitrophenol and nitro guanidine, and thereafter rinsing the coated metal surface in an aqueous solution consisting essentially of about 0.5 to 3% by weight of at least one compound selected from the group consisting of gallic acid, tannic acid, and salts thereof.

References Cited in the file of this patent

UNITED STATES PATENTS

| | | |
|---|---|---|
| 2,431,728 | Bergstein | Dec. 2, 1947 |

FOREIGN PATENTS

| | | |
|---|---|---|
| 13,187 | Australia | Sept. 10, 1903 |
| 159,733 | Australia | Nov. 11, 1954 |
| 891,171 | Germany | Sept. 24, 1953 |